(No Model.)

2 Sheets—Sheet 1.

G. H. ZSCHECH.
MACHINE FOR HARVESTING CORN.

No. 269,553. Patented Dec. 26, 1882.

Witnesses:
M. F. Boyle.
H. A. Johnstone.

Inventor:
G. H. Zschech
by his attorney
T. S. Staton

N. PETERS, Photo-Lithographer, Washington, D. C.

(No Model.) 2 Sheets—Sheet 2.
G. H. ZSCHECH.
MACHINE FOR HARVESTING CORN.
No. 269,553. Patented Dec. 26, 1882.
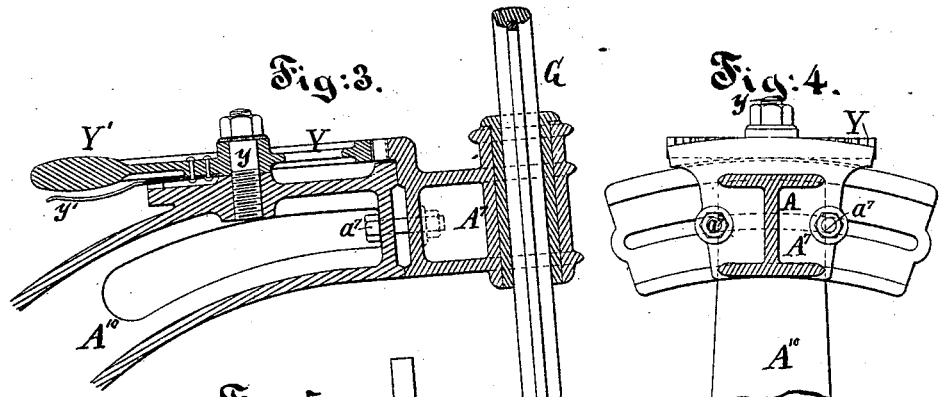
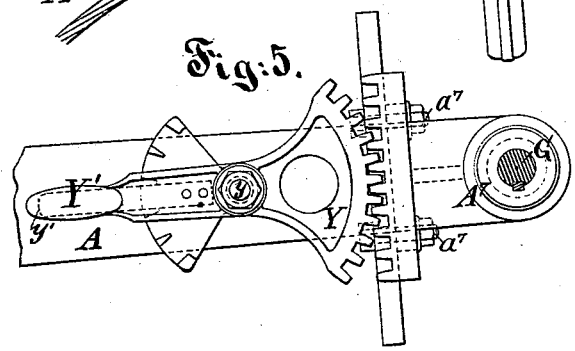
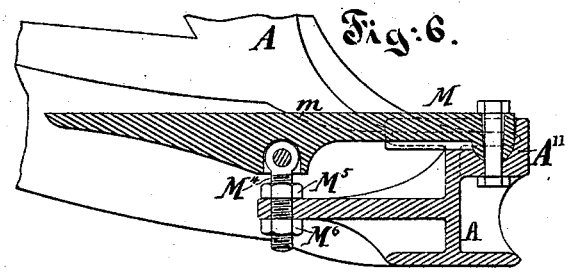
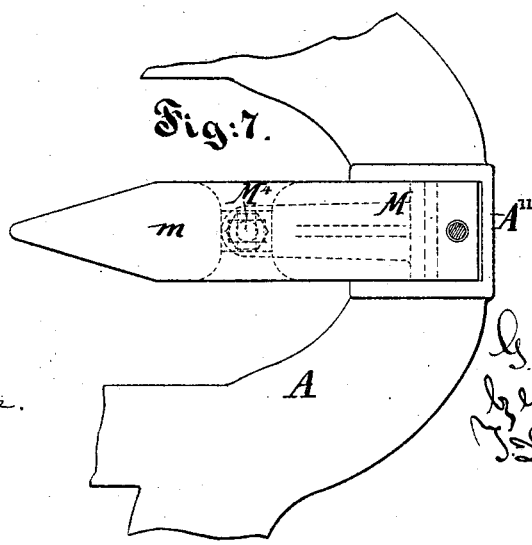
Witnesses:
M. F. Boyle.
H. A. Johnstone.
Inventor:
G. H. Zschech.
by his attorney
T. D. Stetson.

UNITED STATES PATENT OFFICE.

GUSTAVUS H. ZSCHECH, OF INDIANAPOLIS, INDIANA, ASSIGNOR TO ALBERT GALL, OF SAME PLACE.

MACHINE FOR HARVESTING CORN.

SPECIFICATION forming part of Letters Patent No. 269,553, dated December 26, 1882.

Application filed April 12, 1882. (No model.)

*To all whom it may concern:*

Be it known that I, GUSTAVUS H. ZSCHECH, of Indianapolis, Marion county, in the State of Indiana, have invented certain new and useful Improvements relating to Machines for Harvesting Indian Corn and Analogous Crops; and I do hereby declare that the following is a full and exact description thereof.

My machine may be used with some success for harvesting sugar-cane and various other crops; but I will describe the machine as adapted and applied for harvesting Indian corn, sometimes termed "maize." The machine is adapted to be drawn by two horses or other animals walking one on each side of the row of stalks to be cut. Two poles are employed, mounted at a little distance apart, each curved outward at the forward end, to serve as means for gathering the stalks together and for guiding the machine. I provide for cutting off the several stalks at a proper height by the aid of revolving shears. I accompany the shears by a series of revolving fingers. The revolving shears or knives work in shearing contact with a stationary central knife. The latter is capable of being rocked or tilted on a horizontal axis at the rear end. The position of the forward end is adjusted up and down with great delicacy. I provide for steadying and gathering together the stalks at higher levels and urging them through the cutters by means of revolving fingers or reels mounted on upright or nearly upright shafts. I also provide means for setting the latter shafts at different inclinations forward and backward by means of racks and segments of gearing, so as to allow the inclination to be changed rapidly, according as the stalks of Indian corn or other crop are found to be inclined one way or the other.

The following is a description of what I consider the best means of carrying out the invention.

The accompanying drawings form a part of this specification.

Figure 1:
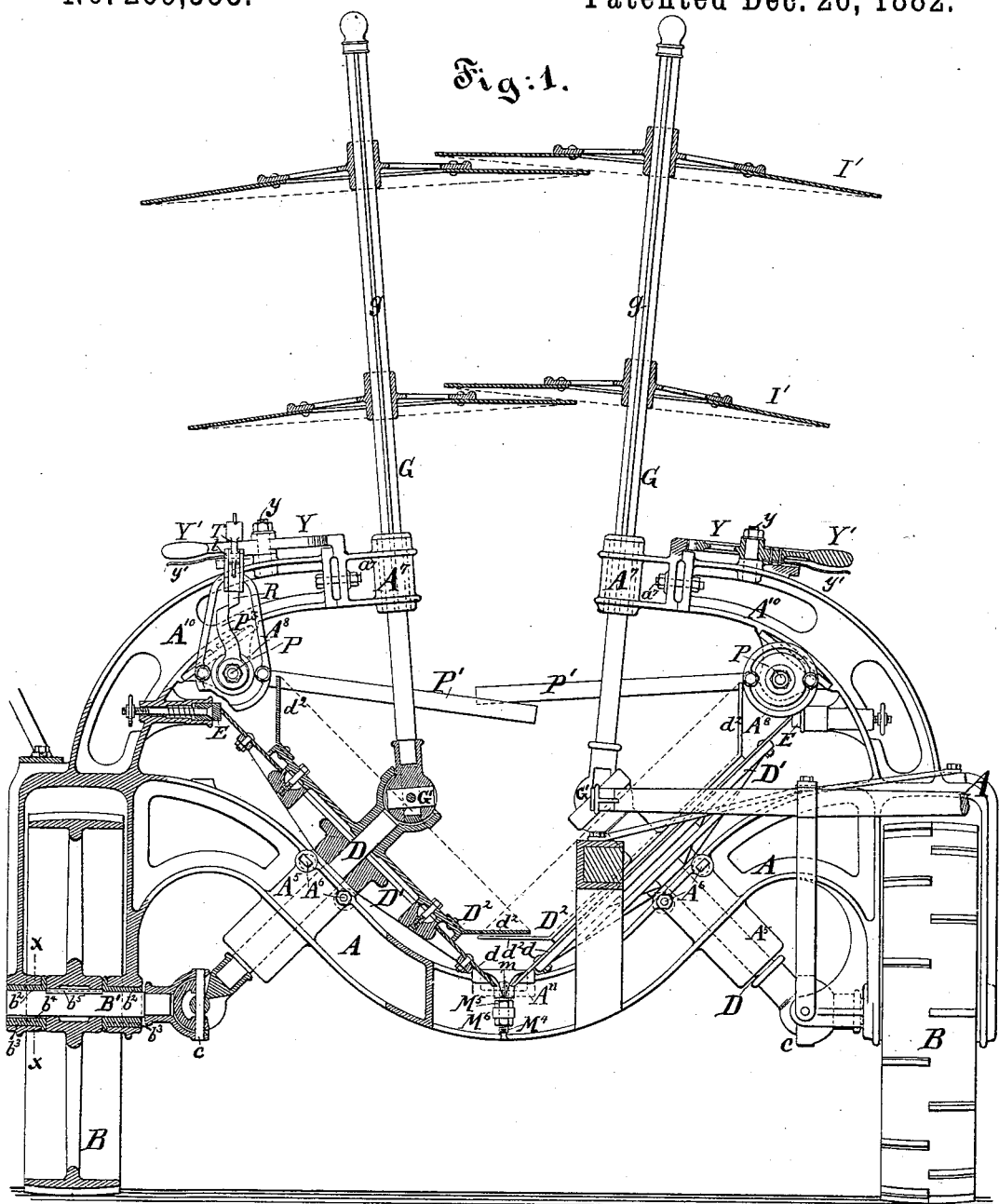
Figure 2:
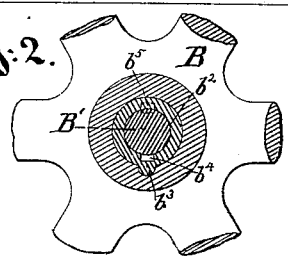

Figure 1 is a general front elevation of the machine, partly in section. Fig. 2 is a section on the line $x\ x$ in Fig. 1, showing a detail on a larger scale. Fig. 3 is a vertical section. Fig. 4 is a side elevation, partly in section. Fig. 5 is a plan. Figs. 3, 4, and 5 represent certain parts of the machine on a larger scale. Figs. 6 and 7 show certain other parts of the machine. Fig. 6 is a vertical section, and Fig. 7 is a plan view.

Similar letters of reference indicate like parts in all the figures.

A is the main frame-work of the machine. I employ slightly divergent and curved poles, and take care to so arrange the means for attaching the animals that there shall be nothing on the inner sides of the poles to interfere with the smooth guidance of the stalks along that surface.

B B are stout bearing-wheels, serving also as driving-wheels for the machinery. B' B' are short shafts of said wheels, and D D are inclined shafts, extending inward and upward therefrom. The union of each shaft B' D by the aid of the pin $c$ and the accompanying parts constitutes a universal joint. The shafts B' are supported at each side of the wheel-hub in removable bearings or bushes $b^2$, which are set in a forked part of the main frame, which partly embraces the wheel B. The construction of these bearings is peculiar and offers great facility for rapidly replacing the parts which are subject to wear without the use of any special tools. The bearings $b^2$ are formed with flanges, as shown, and are inserted into the branches of the forked parts of the framing from the interior. Each piece or bush is formed with a longitudinal ridge or swell, $b^3$, which enters into a corresponding groove, formed in the hole or seat of each branch of the frame, as shown, so as to prevent the turning of the bearing $b^2$. Each of these bush-bearings has a smoothly-bored hole for the reception of the shaft B'. The hole in the exterior piece, $b^2$, is formed with a spline or longitudinal groove, $b^4$, as indicated in Figs. 1 and 2. The width of the hub of the wheel B and of the flanges of both the bushes $b^2$ corresponds greatly to the width of the space between the hubs of the fork of the frame A, so as to prevent lateral play, care being taken to so proportion the parts that the bearings $b^2$ can be inserted from the interior of the fork. The interior of the wheel-hub is also splined, so as to receive the key or feather $b^5$, engaging it with the shaft B'. After the pieces $b^2$ are inserted with their ridges in the corresponding grooves in the holes in the fork the wheel B is brought into place with its hub between the flanges of the pieces $b^2$, and then turned until the spline in the wheel-hub comes in line with the spline in the exterior piece, $b^2$. Then the shaft is inserted from the outside, the key $b^5$ having been previously placed in its seat in said shaft. The spline $b^4$ in the exterior bearing, $b^2$, allows the passage of the shaft with its key, and the latter finally matches into the spline in the wheel-hub. After the shaft B' is thrust in sufficiently far, so that the entire length of its key $b^5$ is received in the spline of the wheel-hub, the wheel B is turned, and it will now be seen that the parts are not liable to become disengaged, as the key $b^5$, bearing against square shoulders in the shaft as well as against the flanges of the piece $b^2$, holds said shaft positively in position, allowing it to turn in the pieces $b^2$ when in use, the motion being transmitted to the shaft from the wheel through the key $b^5$.

When it is desired to separate the parts to substitute fresh bushings $b^2$, or for any other reason, it is only necessary to slowly turn the wheel, feeling at the same time on the shaft until the position is reached in which its key comes in line with the spline $b^4$ of the exterior bearing-piece, when the shaft may be thrust out.

On each shaft D is carried a wheel, D', which supports and rotates a circular knife, $d$. On the upper and inner face of each knife $d$ is a reel, $D^2$, having a rim, which presses fairly against the knife $d$ near the periphery of the latter, and fingers $d^2$, reaching outward in inclined positions, as indicated in Fig. 1. The two inclined rotary knives $d$ $d$ run with their lower portions in shearing contact with a stationary knife, $m$ M, which is mounted at its rear end on a suitable support or socket, A'', cast with and forming a part of the fixed frame-work A by a bearing, which allows it to be rocked. Its forward end, $m$, is rounded or dull-pointed, and adapted to separate the several stalks as they are successively crowded against it while the machine is moved rapidly forward. All the stalks which are carried to one side of this stationary knife are sheared off by the contact of the knife $d$ on that side. All the stalks which are carried to the other side are sheared off by the contact of the other knife $d$. The fingers $d^2$, by rotating with the knives $d$, engage with the several stalks and insure their prompt movement through the cutters. The adjustment of the forward end $m$ of the knife is effected by the aid of an eye-bolt, $M^4$, pivoted to $m$ forward of the socket A'', and capable of being delicately adjusted by nuts $M^5$ $M^6$, which engage respectively above and below a forwardly-projecting portion of the fixed framing A, as shown in Fig. 6.

E E are sharpening-blocks, of emery or analogous materials, mounted in housings with springs. They apply against the revolving knives $d$ and keep them constantly sharp.

The several stalks are retained on the machine for a greater or less period until a sufficient number have accumulated to make one convenient bunch or bundle. This is effected by means of the arms P' P', fixed on partially rotating shafts P, supported in stationary bearings in a sleeve, $A^8$, bolted to the fixed frame-work. I provide by a strong spring-catch and attached means for holding these parts firmly up to receive a sufficient bundle of the stalks, and then to let them go suddenly to deposit the same on the ground. Coiled springs surround each shaft P in the space provided between it and its inclosing casing. One end of each of these springs engages with a hub fixed on its respective shaft P. The other end of the spring engages with a ratchet-wheel, which is adjustable when required, and held in the desired position by a suitable pawl. By this means the force of the springs may be adjusted with the required degree of nicety. There is sufficient length of each coiled spring to allow a liberal turning motion to the shafts P. The tension of the springs should be so adjusted that when a sufficient quantity of stalks has by the action of the machine been cut off and caused to lie on or to strongly press against the arms P' the weight thereof is sufficient to turn the respective shafts P in opposition to the force of the springs and cause the discharge of the bundle in a mass upon the ground; yet there should be sufficient tension to the springs to turn the shafts P, with their respective arms, promptly back again to the position for receiving more stalks as soon as the bundle is thus delivered. The arms P' are set at such angles in their respective shafts P that they cross each other. The coiled spring around one shaft P is adjusted more stiffly than that around the other. It follows that immediately on the delivery of the bundle of stalks one of the arms P' rises promptly to its place and the other follows more tardily. Thus that arm with the weaker spring is certain to lie under the other. The shaft P, carrying the supporting-arm having the weaker spring, (shown in Fig. 1 on the left side,) has on its front end an arm, $P^3$, formed with a beveled end. When the respective bars P' are in position for receiving stalks the arm $P^3$ is held rigidly by a sliding catch, R, correspondingly beveled, mounted, and free to slide vertically in the frame-work. This catch R is urged downward with gentle force by a suitable spring inclosed in the framing. T is a lever turning on a fixed center, $t$, and engaging under a cross-pin in the slide R. The lever T is pulled by the attendant riding in a seat conveniently mounted, and by pulling thereon at the proper time he can turn the lever T and raise the slide R sufficiently to liberate the arm $P^3$. Care being taken to do this only when there is a sufficient load of stalks lying on the arms P', much greater than can be supported by the tension of their springs, the movement of the lever T results in a prompt partial rotation of each shaft P, and the discharge of the bundle of stalks. This is followed by the prompt return, first, of the arm P' on the left side of the machine, and immediately after of the arm P' on the right side, the beveled end of the arm $P^3$ lifting the sliding catch R and being engaged by it so soon as it has passed.

It is obviously important to provide against the rise of the arms P' too high. This is accomplished by a stop or dog on each shaft P engaging with a corresponding stop on the fixed frame-work A. Each of the dogs carried by the shaft P is held thereon by a pinching-screw, so that it can be adjusted to regulate the stopping of the arms P' at such height as may be desired.

Each shaft D is extended inward and upward beyond the knife $d$ and the accompanying reel $D^2$, and each is connected by a universal joint, G', to a shaft, G, extending upward and outward, and which may incline forward or backward, or neither, as desired. Each shaft G is supported by the universal joint G' and by an adjustable bearing, $A^7$, mounted at a suitable elevation on an arched arm or horn, $A^{10}$, of the framing A. Above the bearings $A^7$ the shafts G are splined or grooved, and carry one or more pairs of reels or spider-wheels, I', which serve to guide the stalks through the machine in an upright or nearly upright position as they are cut off below by the circular cutters $d$. The reels I' may be adjusted up and down on the shafts G by means of pinching-screws, the feathers $g$ always insuring the turning of the reels I' with the shafts G. These shafts G require to be inclined forward or backward considerably under some conditions, eminently when the stalks are temporarily inclined in consequence of a high wind or from any other cause. I provide for inclining the two shafts G backward and forward with great promptness. Each may be shifted independently. The means being similar, a description of one will suffice for both. The adjacent face of each horn $A^{10}$ is adapted to engage with and also to allow the corresponding bearing, $A^7$, to move forward and backward to accommodate itself to the changing angle of the shaft G, which it is to support. The upper edge of each bearing $A^7$ is formed with rack-teeth, as shown.

Y is a geared segment, corresponding to the rack $A^7$ and engaged therewith. It turns on a pivot, $y$, fixed on the horn $A^{10}$, and is provided with a handle, Y', and spring-dog $y'$, the latter arranged to engage in suitable notches on $A^{10}$. Whenever it is desired to shift the inclination of either of the shafts G, the attendant grasps the corresponding handle, Y', and with it the spring-dog $y'$, so as to disengage the latter from its notch. Then a strong movement of the hand turns the segment Y and shifts the bearing $A^7$ forward or backward, as required. On releasing the parts the spring-dog $y'$ engages in the proper notch and holds the bearing $A^7$ in the new position, and consequently holds the shaft G at the new inclination until occasion shall arise for again changing it.

$a^7$ are retaining-bolts, the nuts on which are set to hold the bearing $A^7$ against the face of the horn $A^{10}$ without play between these parts, but still with sufficient looseness to allow the bearing $A^7$ to slide on the face of the horn $A^{10}$ when so moved by means of the lever and segment Y Y.

Modifications may be made in many of the details.

I can use other forms of universal joint than that shown. I can enlarge the diameter and change the dimensions and proportions of many of the other parts.

I can employ any number of toothed wheels or corresponding spider-armed devices on the shafts G. I have shown a few such. It is important to arrange them so that one can turn faster than the other or independently of the other. It will be observed that as the cutting devices on the respective sides are driven independently by their respective driving-wheels, the motions do not always correspond, and in some cases, especially in turning short corners, the motions of the cutting devices on the two sides are very unequal, or even possibly in opposite directions. I allow this by mounting the reel or reels on one side sufficiently higher than the reel or reels on the other side to allow each to revolve freely without contact with the other, while they are sufficiently near to act as a unit on the stalks which are received and moved by them.

I do not in this patent claim the means for sharpening the cutters, accumulating the stalks in bunches and discharging them, or any of the combinations or parts, except as hereinafter recited.

I claim as my invention—

1. In a harvesting-machine, the adjustable center knife, $m$ M, turning in a socket, A'', near the heel, in combination with the eye-bolt $M^4$ and nuts $M^5$ $M^6$, and with the framing A and revolving shears $d$ and suitable impelling means for the latter, substantially as herein specified.

2. The movable bearing $A^7$ and adjustable segment Y, with means, as Y' $y'$, for operating and securing the latter, in combination with each other, and with the shafts G, carrying the reels I' and their impelling means, arranged to serve substantially as herein specified.

3. The bearing composed of two fixed hubs, carrying bearing pieces or bushes $b^2$, applied from within, and having means to prevent their turning, in combination with a splined wheel-hub and a shaft, B', the latter carrying a key, $b^5$, the whole so arranged that the shaft with its key may be introduced from one end, but is prevented from becoming disengaged by the abutting ends of the key, except in one position of the wheel-hub, substantially as herein specified.

In testimony whereof I have hereunto set my hand, at Indianapolis, Indiana, this 24th day of March, 1882, in the presence of two subscribing witnesses.

GUSTAVUS H. ZSCHECH.

Witnesses:
JOHN W. CLAYPOOL,
CHARLES C. STETSON.